US010354678B2

United States Patent
Tang et al.

(10) Patent No.: US 10,354,678 B2
(45) Date of Patent: Jul. 16, 2019

(54) METHOD AND DEVICE FOR COLLECTING SOUNDS CORRESPONDING TO SURVEILLANCE IMAGES

(71) Applicant: Xiaomi Inc., Beijing (CN)

(72) Inventors: Mingyong Tang, Beijing (CN); Huayijun Liu, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 125 days.

(21) Appl. No.: 15/198,299

(22) Filed: Jun. 30, 2016

(65) Prior Publication Data

US 2017/0032805 A1 Feb. 2, 2017

(30) Foreign Application Priority Data

Jul. 31, 2015 (CN) .......................... 2015 1 0462792

(51) Int. Cl.
*G10L 25/78* (2013.01)
*H04N 5/14* (2006.01)
(Continued)

(52) U.S. Cl.
CPC .......... *G10L 25/78* (2013.01); *G06K 9/00664* (2013.01); *G06K 9/00771* (2013.01);
(Continued)

(58) Field of Classification Search
CPC ..... G06K 9/00342; G06K 2009/00738; G06K 9/00711; G06K 9/00724; G06K 9/00751;
(Continued)

(56) References Cited

U.S. PATENT DOCUMENTS 5,625,572 A * 4/1997 Yonekura ........... G05B 23/0264
348/E7.078
9,613,508 B2 * 4/2017 Park ................... G08B 13/1672
(Continued)

FOREIGN PATENT DOCUMENTS

CN 101786272 A 7/2010
CN 102056053 A 5/2011
(Continued)

OTHER PUBLICATIONS

Russian Office Action dated Jun. 15, 2017 in Russian Patent Application No. 2016115037 (with English translation).
(Continued)

*Primary Examiner* — Chikaodili E Anyikire
*Assistant Examiner* — Kehinde Abimbola
(74) *Attorney, Agent, or Firm* — Oblon, McClelland, Maier & Neustadt, L.L.P.

(57) ABSTRACT

Aspects of the disclosure provide a method for collecting sounds associated with surveillance images. The method includes identifying a sound-making surveilled object in the surveillance images, the surveillance images being captured by a camera of a monitoring device; determining whether a sound acquiring device meets a preset condition corresponding to that a signal strength of the sounds collected by the sound acquiring device from the identified surveilled object is greater than a signal strength of the sounds collected by the monitoring device from the identified surveilled object; and, when determining that the sound acquiring device meets the preset condition, controlling the sound acquiring device to collect the sounds from the identified surveilled object.

15 Claims, 10 Drawing Sheets

(51) Int. Cl.
*H04N 5/92* (2006.01)
*H04N 7/18* (2006.01)
*G06K 9/00* (2006.01)

(52) U.S. Cl.
CPC .......... *H04N 5/144* (2013.01); *H04N 5/9202* (2013.01); *H04N 7/183* (2013.01); *G10L 2025/783* (2013.01)

(58) Field of Classification Search
CPC .......... G06K 9/00718; G06K 9/00664; G06K 9/00771; G06K 9/78; G11B 27/031; G11B 2020/10592; G11B 20/10527; G11B 27/17; G11B 27/34; G11B 27/022; H01L 2224/73265; H01L 2924/00; H01L 2924/00012; H01L 2224/32225; H01L 2224/48227; H01L 2224/32245; H01L 2224/48247; H01L 2924/15311; H01L 2924/3011; H01L 2924/3025; H01L 2223/6677; H01L 2224/16225; A61B 5/024; A61B 2562/0219; A61B 5/4023; A61B 5/486; A61B 2560/0443; A61B 2560/06; A61B 5/1122; A61B 5/1124; A61B 5/1126; A61B 5/1127; A61B 5/6824; A61B 5/6828; A61B 5/0022; A61B 2560/0412; A61B 2560/045
See application file for complete search history.

(56) References Cited

U.S. PATENT DOCUMENTS

| | | | |
|---|---|---|---|
| 2011/0087535 A1* | 4/2011 | Yoshizawa | G06Q 20/20 705/14.26 |
| 2011/0208516 A1 | 8/2011 | Kuboyama | |
| 2012/0002047 A1 | 1/2012 | An et al. | |
| 2012/0203078 A1* | 8/2012 | Sze | G06F 19/3418 600/301 |
| 2014/0135588 A1* | 5/2014 | Al-Ali | G06F 19/00 600/300 |
| 2014/0307096 A1* | 10/2014 | Park | G08B 13/1672 348/152 |
| 2015/0181171 A1* | 6/2015 | Park | H04N 7/18 348/143 |
| 2015/0279181 A1* | 10/2015 | Park | G08B 13/1672 367/136 |
| 2016/0125879 A1* | 5/2016 | Lovitt | G10L 17/10 704/275 |
| 2016/0148493 A1* | 5/2016 | Arakawa | G08B 25/10 348/143 |

FOREIGN PATENT DOCUMENTS

| | | |
|---|---|---|
| CN | 102385389 B | 3/2012 |
| CN | 103002250 A | 3/2013 |
| CN | 103595953 A | 2/2014 |
| CN | 103841360 A | 6/2014 |
| CN | 104574745 A | 4/2015 |
| CN | 105049807 A | 11/2015 |
| EA | 200501470 A1 | 2/2006 |
| JP | 9-81233 | 3/1997 |
| JP | 2005-252660 A | 9/2005 |
| JP | 2009-105612 A | 5/2009 |
| JP | 2010-232888 A | 10/2010 |
| JP | 2010-233145 | 10/2010 |
| JP | 2011-193392 A | 9/2011 |
| JP | 2013-16929 A | 1/2013 |
| JP | 5189536 B2 | 4/2013 |
| JP | 2014-137767 A | 7/2014 |
| KR | 10-2006-0109153 A | 10/2006 |
| KR | 10-2015-0060626 | 6/2015 |
| WO | WO 2014/161402 A2 | 10/2014 |
| WO | WO 2017/020507 A1 | 2/2017 |

OTHER PUBLICATIONS

Russian Search Report dated Jun. 14, 2017 Russian Patent Application No. 2016115037 (with English translation).
Combined Chinese Office Action and Search Report dated Sep. 20, 2017 in Chinese Patent Application No. 201510462792.9 (with English translation of Category of Cited Documents).
Von Thomas Jüngling, "Diese Hightech-polizei Schützt Sie vor Einbrechern", retrieved from the internet: https://www.welt.de/wirtschaft/webwelt/article133042130/Diese-Hightech-Polizei-schuetzt-Sie-vor-Einbrechern.html , XP002765325, Oct. 8, 2014, pp. 1-8 (with English abstract).
Extended European Search Report dated Jan. 3, 2017 in European Patent Application No. 16179302.1.
Korean Notice of Allowance dated Jul. 14, 2017 in Korean Patent Application No. 10-2016-7004628 (with English translation).
Office Action dated Feb. 25, 2019, in Indian Patent Application No. 201637009190 (with English-language translation).

* cited by examiner

METHOD AND DEVICE FOR COLLECTING SOUNDS CORRESPONDING TO SURVEILLANCE IMAGES

CROSS-REFERENCE TO RELATED APPLICATIONS

This application is based upon and claims priority to Chinese Patent Application No. 201510462792.9, filed Jul. 31, 2015, the entire contents of which are incorporated herein by reference.

TECHNICAL FIELD

The present disclosure generally relates to the field of computer technologies, and more particularly, to a method and device for collecting sounds associated with surveillance images.

BACKGROUND

Cameras can be used to monitor the occurrences of various events, and the monitoring function of cameras is widely applied to, for example, traffic surveillance, supermarket surveillance, or community surveillance, and the like.

During surveillance using cameras in a monitoring device, if a sound-making surveilled object in the surveillance images (i.e., an image of the sound-making surveilled object is visible in the surveillance images) is relatively far from the monitoring device, the monitoring device cannot clearly collect the sound from the surveilled object, and thus the surveillance information is not complete.

SUMMARY

Aspects of the disclosure provide a method for collecting sounds associated with surveillance images. The method includes identifying a sound-making surveilled object in the surveillance images, the surveillance images being captured by a camera of a monitoring device; determining whether a sound acquiring device meets a preset condition corresponding to that a signal strength of the sounds collected by the sound acquiring device from the identified surveilled object is greater than a signal strength of the sounds collected by the monitoring device from the identified surveilled object; and, when determining that the sound acquiring device meets the preset condition, controlling the sound acquiring device to collect the sounds from the identified surveilled object.

In an embodiment, the method further includes, when determining that the sound acquiring device does not meet the preset condition, collecting the sounds from the identified surveilled object by the monitoring device.

In an embodiment, identifying the sound-making surveilled object in the surveillance images includes detecting a movement of the surveilled object that corresponds to a predetermined sound-making movement, the predetermined sound-making movement including the surveilled object entering a surveillance area or the surveilled object having moving lips; or determining whether the surveilled object is a predetermined sound-making object, the predetermined sound-making object including a door, a window, or a home appliance; or detecting, by a detection device associated with the surveilled object, one or more parameters, and identifying the sound-making surveilled object based on the one or more parameters from the detection device, the one or more parameters including an on/off state, a temperature, a change of a heat source, or a physiological feature of the surveilled object.

In an embodiment, determining whether the sound acquiring device meets the preset condition includes determining whether the signal strength of the sounds from the identified surveilled object collected by the monitoring device is smaller than a preset sound threshold; and, when determining that the signal strength of the sounds from the identified surveilled object collected by the monitoring device is smaller than the preset sound threshold, determining that the sound acquiring device meets the preset condition.

In an embodiment, determining whether the sound acquiring device meets the preset condition includes: identifying a sound acquiring device closest to the sound-making surveilled object among all sound acquiring devices associated with the monitoring device, and determining the identified sound acquiring device as the sound acquiring device meeting the preset condition; or controlling all sound acquiring devices associated with the monitoring device to collect the sounds from the sound-making surveilled object, and determining a sound acquiring device that detects a strongest signal strength of the sounds from the sound-making surveilled object as the sound acquiring device meeting the preset condition; or determining at least one mobile device associated with the monitoring device as the sound acquiring device meeting the preset condition.

In an embodiment, identifying the sound acquiring device closest to the sound-making surveilled object among all the sound acquiring devices associated with the monitoring device includes: identifying the sound acquiring device closest to the sound-making surveilled object among all the sound acquiring devices associated with the monitoring device by performing an indoor positioning process; or determining a location of the sound-making surveilled object by performing an image recognition process, and determining a sound acquiring device for monitoring the sounds from the sound-making surveilled object according to respective surveillance area ranges corresponding to the sound acquiring devices.

Aspects of the disclosure provide a device for collecting sounds associated with surveillance images. The device includes a processor and a memory for storing instructions executable by the processor. The processor is configured to identify a sound-making surveilled object in the surveillance images, the surveillance images being captured by a camera of a monitoring device, to determine whether a sound acquiring device meets a preset condition corresponding to that a signal strength of the sounds collected by the sound acquiring device from the surveilled object is greater than a signal strength of the sounds collected by the monitoring device from the surveilled object, and to, when determining that the sound acquiring device meets the preset condition, control the sound acquiring device to collect the sounds from the identified surveilled object.

In an embodiment, the processor is configured to, when determining that the sound acquiring device does not meet the preset condition, collect the sounds from the identified surveilled object by the monitoring device.

Aspects of the disclosure provide a non-transitory computer-readable storage medium having stored therein instructions that, when executed by a processor of a monitoring device, causes the monitoring device to perform a method for collecting sounds associated with surveillance images. The method includes: identifying a sound-making surveilled object in the surveillance images, the surveillance images being captured by a camera of a monitoring device;

determining whether a sound acquiring device meets a preset condition corresponding to that a signal strength of the sounds collected by the sound acquiring device from the surveilled object is greater than a signal strength of the sounds collected by the monitoring device from the surveilled object; and, when determining that the sound acquiring device meets the preset condition, controlling the sound acquiring device to collect the sounds from the identified surveilled object.

In an embodiment, the instructions that, when executed by the processor of the monitoring device, causes the monitoring device to perform a method further including, when determining that the sound acquiring device does not meet the preset condition, collecting the sounds from the identified surveilled object by the monitoring device.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
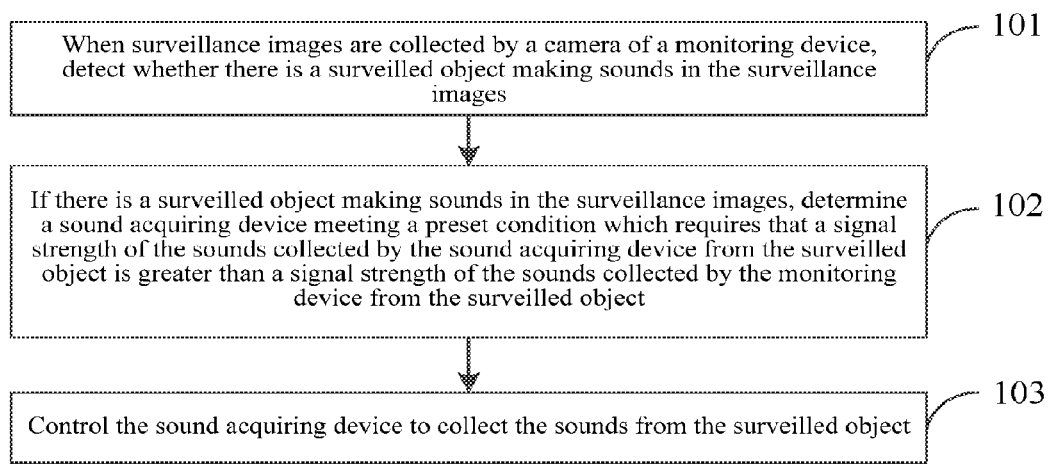
FIG. 1 is a flowchart showing a method for collecting sounds associated with surveillance images according to an exemplary embodiment.

FIG. 1 is a flowchart showing a method for collecting sounds associated with surveillance images according to an exemplary embodiment. As shown in FIG. 1, the method for collecting sounds associated with surveillance images includes the following steps.

In step 101, when surveillance images are captured by a camera of a monitoring device, whether there is a sound-making surveilled object in the surveillance images is detected.

Generally, a monitoring device can collect not only surveillance images but also sounds made by a surveilled object in the surveillance images.

In step 102, if there is a sound-making surveilled object in the surveillance images identified in step 101, whether a sound acquiring device meets a preset condition is determined. The preset condition corresponds to that a signal strength of sound from the identified surveilled object detected by the sound acquiring device is greater than a signal strength of the sound from the identified surveilled object detected by the monitoring device.

At present, even though a monitoring device can clearly collect surveillance images, the monitoring device may not effectively collect the sounds from a surveilled object in the surveillance images. For example, if the surveilled object in the surveillance images makes very weak sounds or the surveilled object in the surveillance images is relatively far from the monitoring device, the sounds from the surveilled object cannot be clearly collected by the monitoring device, and may even be automatically filtered by the monitoring device. Thus, in some examples, an additional sound acquiring device meeting a preset condition is required to collect the sounds from the surveilled object.

The preset condition here may be various conditions that correspond to that a signal strength of the sounds collected by the sound acquiring device from the surveilled object is greater than a signal strength of the sounds collected by the monitoring device from the surveilled object. When the preset condition is met, the sound acquiring device meeting the preset condition is turned on to collect the sounds from the surveilled object.

The sound acquiring device here may be devices having sound collecting members such as a mobile phone, an audio apparatus, or a Bluetooth headset.

In step 103, when determining that the sound acquiring device meets the preset condition, the sound acquiring device is controlled to collect the sounds from the surveilled object. Thus, the audio signal is recorded based on the sound from the identified surveilled object collected by the sound acquiring device.

When the monitoring device detects that the surveilled object in the surveillance images makes sounds but the sounds from the surveilled object are too weak or the surveilled object is too far from the monitoring device, the monitoring device cannot clearly collect the sounds from the surveilled object. At this time, the monitoring device may control the sound acquiring device meeting the preset condition to collect the sounds from the surveilled object.

In view of the above, in the method for collecting sounds associated with surveillance images provided by embodiments of the present disclosure, a sound-making surveilled object in the surveillance images is identified, and a sound acquiring device which collects sounds of a greater signal strength from the surveilled object than the signal strength of the sounds collected by the monitoring device from the surveilled object is controlled to collect the sounds from the surveilled object. Thus, the present disclosure can solve the problem that a monitoring device cannot clearly collect sounds from a surveilled object which is relatively far from the monitoring device. The monitoring device controls the sound acquiring device to collect the sounds from the surveilled object, and thus the surveillance information becomes more complete.

Figure 2A:
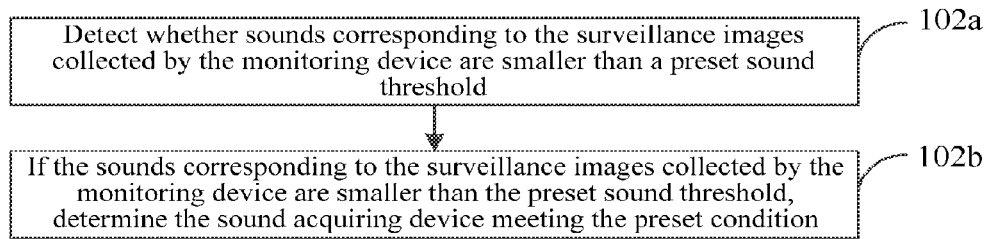
FIG. 2A is a flowchart showing a method for determining whether a sound acquiring device meets a preset condition according to an exemplary embodiment.

FIG. 2A is a flowchart showing a method for determining whether a sound acquiring device meets a preset condition according to an exemplary embodiment. In an example implementation, the step 102 in FIG. 1 may include steps 102a to 102b depicted in FIG. 2A. As shown in FIG. 2A, the detection of whether there is a sound-making surveilled object in surveillance images by the monitoring device may include the following steps.

In step 102a, whether the signal strength of the sounds associated with the surveillance images collected by the monitoring device is less than a preset sound threshold is determined.

When the sounds from the surveilled object in the surveillance images are too weak or the surveilled object in the surveillance images is too far from the monitoring device, the sounds made by the surveilled object cannot be clearly collected by the monitoring device. Thus, the preset sound threshold here refers to a threshold determining whether the monitoring device can clearly collect the sounds from the identified sound-making surveilled object. When the signal strength of the sounds from the identified sound-making surveilled object collected by the monitoring device is less than the preset sound threshold, the monitoring device is considered as incapable of effectively collecting the sounds associated with the surveillance images temporarily.

In step 102b, if the signal strength of the sounds associated with the surveillance images collected by the monitoring device is less than the preset sound threshold, a sound acquiring device other than the monitoring device is determined as meeting the preset condition.

When the signal strength of the sounds from the identified sound-making surveilled object collected by the monitoring device is less than the preset sound threshold, the monitoring device is considered as incapable of effectively collecting the sounds associated with the surveillance images temporarily. Thus, the sound acquiring device meeting the preset condition will be used to collect the sounds associated with the surveillance images instead of the monitoring device.

In view of the above, in the method for collecting sounds associated with surveillance images provided by embodiments of the present disclosure, a sound-making surveilled object in the surveillance images is identified, and a sound acquiring device which collects sounds of a greater signal strength from the surveilled object than the signal strength of the sounds collected by the monitoring device from the surveilled object is controlled to collect the sounds from the surveilled object. Thus, the present disclosure can solve the problem that a monitoring device cannot clearly collect sounds from a surveilled object which is relatively far from the monitoring device. The monitoring device controls the sound acquiring device to collect the sounds from the surveilled object, and thus the surveillance information becomes more complete.

In addition, when the monitoring device cannot clearly collect the sounds made by the surveilled object, the monitoring device may send a collection instruction to a sound acquiring device meeting a preset condition to instruct the sound acquiring device to collect the sounds from the surveilled object. The preset condition requires that the sound acquiring device is closest to the surveilled object, or that the sound acquiring device collects the strongest sound signal, or that the sound acquiring device is a mobile device associated with the monitoring device.

Figure 2B:
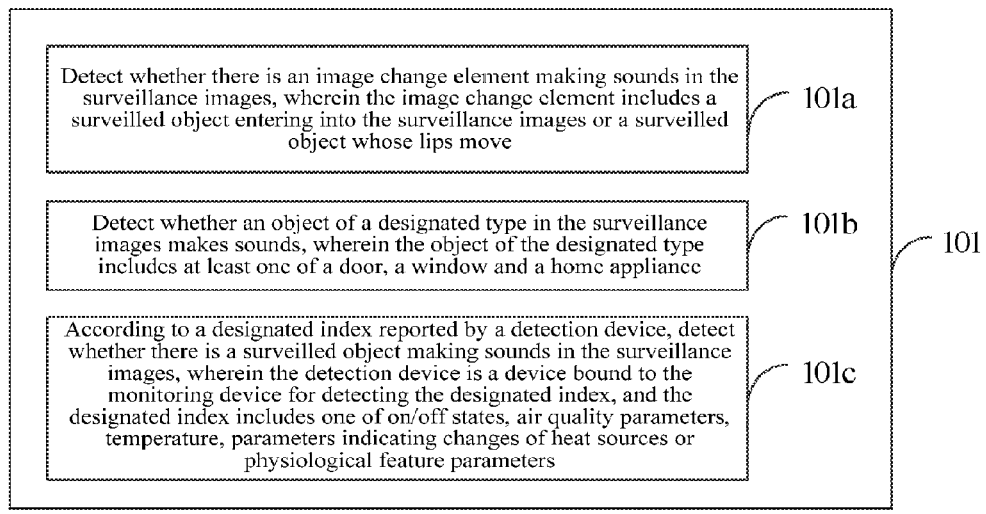
FIG. 2B is a flowchart showing a method for identifying a sound-making surveilled object in the surveillance images according to an exemplary embodiment.

FIG. 2B is a flowchart showing a method for identifying a sound-making surveilled object in the surveillance images according to an exemplary embodiment. Various example implementations of Step 101 are shown in FIG. 2B. As shown in FIG. 2B, step 101 may include one or more of the following three implementations.

In a first implementation 101a, whether there is an image change element corresponding to making sounds in the surveillance images is detected. For example, a movement of the surveilled object that corresponds to a predetermined sound-making movement is detected. The predetermined sound-making movement includes the surveilled object entering a surveillance area or the surveilled object having moving lips.

Figure 2C:
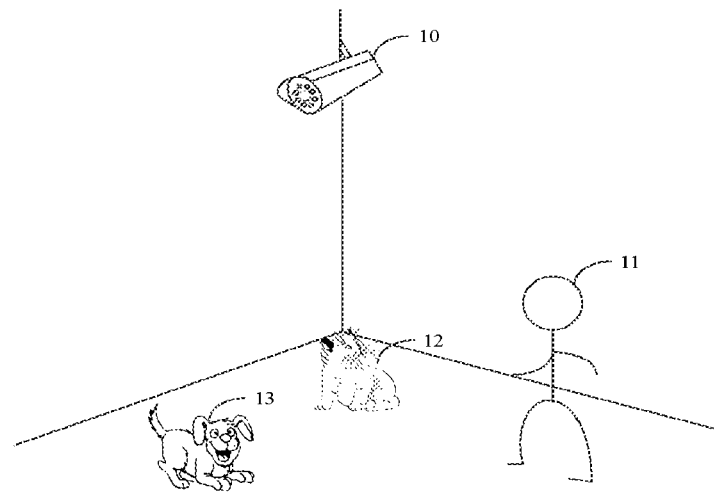
FIG. 2C is a schematic diagram showing that a surveilled object enters into a surveillance area according to an exemplary embodiment.
Figure 2D:
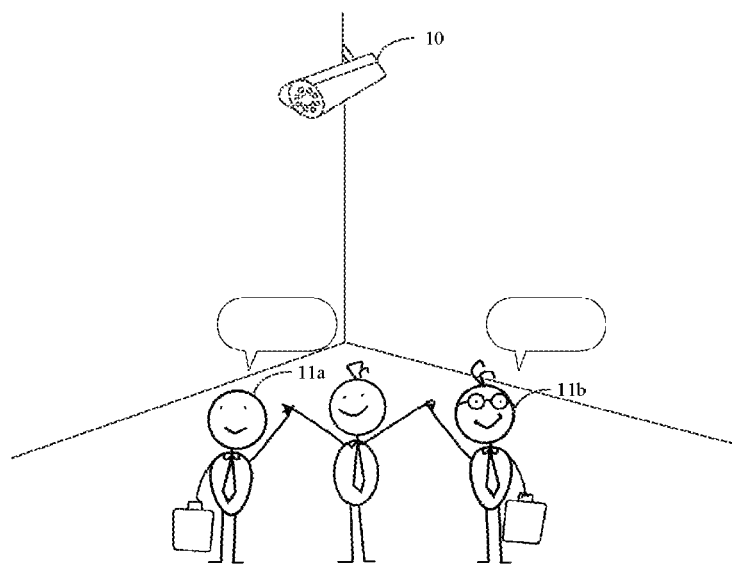
FIG. 2D is a schematic diagram showing that there is a surveilled object having moving lips in surveillance images according to an exemplary embodiment.

FIG. 2C is a schematic diagram showing surveilled objects entering into a surveillance area corresponding to the surveillance images according to an exemplary embodiment. As shown in FIG. 2C, when a person 11, a cat 12 and a dog 13 move into a surveillance area surveilled by a monitoring device 10, the monitoring device 10 can determine the person 11, the cat 12, and the dog 13 as the surveilled objects. FIG. 2D is a schematic diagram showing surveilled objects whose lips move in the surveillance images according to an exemplary embodiment. As shown in FIG. 2D, when persons 11a and 11b in the images surveilled by the monitoring device 10 are talking, the monitoring device 10 can determine the persons 11a and 11b as the surveilled objects when detecting that the lips of the persons 11a and 11b move.

In a second implementation 101b, whether an object in the surveillance images is a predetermined sound-making object is determined. The predetermined sound-making object includes at least one of a door, a window, or a home appliance.

Sometimes, when a door, a window, or a home appliance in surveillance images makes sounds (for example when a person is knocking at a door, a TV is turned on, or a fan runs), no significant changes will occur in the surveillance images. Thus, in some examples, a predetermined sound-making object is an object of a designated type which does not move and the camera needs to determine whether to acquire sounds of the object according to the recognized type of the object.

Figure 2E:
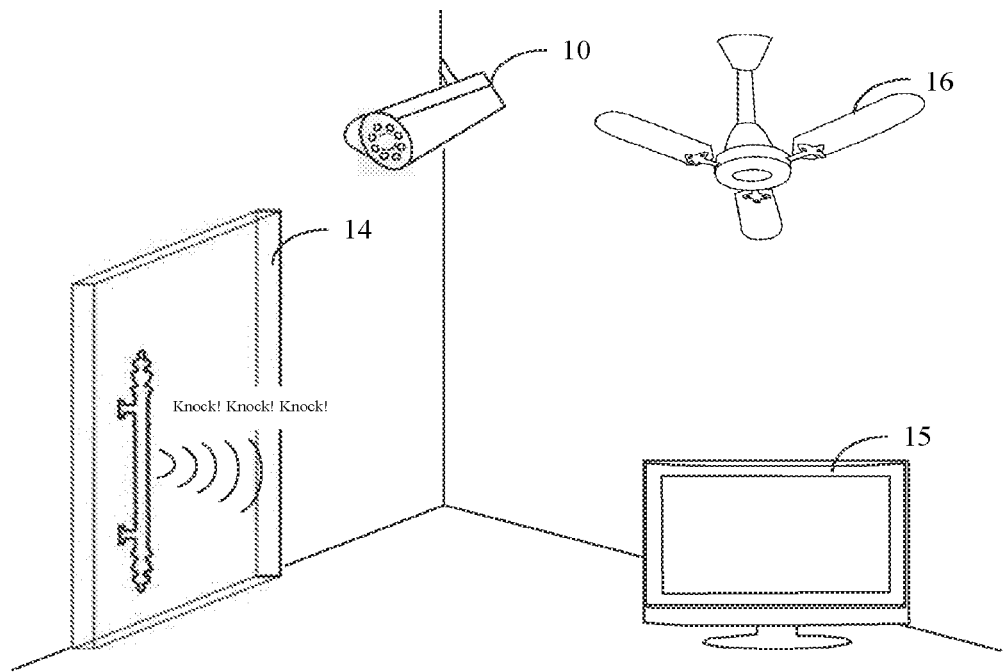
FIG. 2E is a schematic diagram showing an object in the surveillance images being a predetermined sound-making object according to an exemplary embodiment.

FIG. 2E is a schematic diagram showing an object of a designated type making sounds in the surveillance images according to an exemplary embodiment. As shown in FIG. 2E, when a door 14 is knocked at, a TV 15 is turned on, or a fan 16 runs in the surveillance images, even though there is no significant changes in the whole surveillance images, the monitoring device 10 may still deem the door 14, the TV15, or the fan 16 as the surveilled objects according to the knock, the sound made by TV program, or the sound made by blades of the fan.

In a third implementation 101c, according to a designated index or one or more parameters reported by a detection device, a sound-making surveilled object in the surveillance images is identified. The detection device is a device associated with the monitoring device for detecting the designated index or the one or more parameters, and the designated index or the one or more parameters include an on/off state, a temperature, a change of a heat source, or a physiological feature of the surveilled object.

When the sounds made by the surveilled object in the surveillance images are too weak, the monitoring device may determine which surveilled object in the surveillance images is a sound-making surveilled object via a detection device. The detection device here refers to a device for detecting states of the surveilled objects and is installed around the surveilled objects or on the surveilled objects.

For example, the detection device is installed on a switch of a home appliance. When the home appliance is turned on, the detection device sends the turning-on state data back to the monitoring device. After receiving the data, the monitoring device determines that the home appliance is a sound-making surveilled object, and sends a collection instruction to a sound acquiring device meeting a preset condition to instruct the sound acquiring device meeting the preset condition to collect the sounds from the home appliance. In another example, the detection device may be installed nearby a window or a door. When the door or the window is open, and the detection device senses the temperature changes of the ambient air, the detection device feeds the temperature change data back to the monitoring device. After receiving the data, the monitoring device determines that the window or the door is a sound-making surveilled object, and sends a collection instruction to a sound acquiring device meeting a preset condition to instruct the sound acquiring device meeting the preset condition to collect the sounds from the door or the window.

Figure 2F:
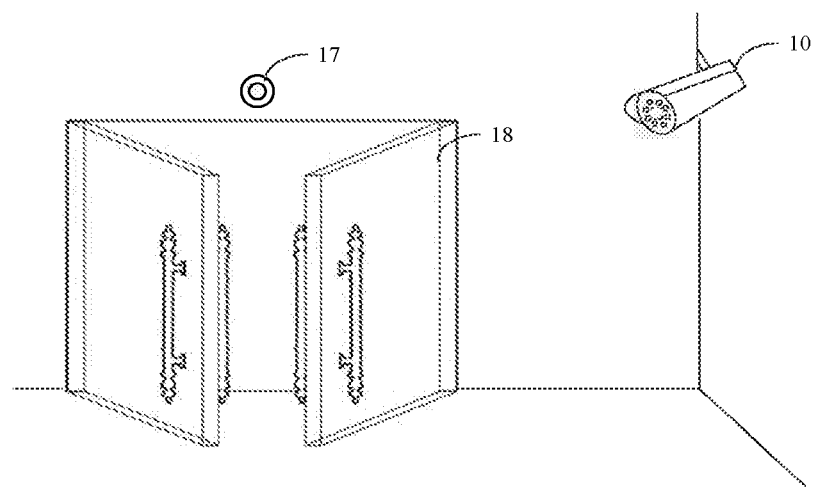
FIG. 2F is a schematic diagram showing detection of whether there is a sound-making surveilled object in the surveillance images according to one or more parameters reported by a detection device according to an exemplary embodiment.

FIG. 2F is a schematic diagram showing detection of whether there is a sound-making surveilled object in the surveillance images according to one or more parameters reported by a detection device according to an exemplary embodiment. As shown in FIG. 2F, when a door 18 in the surveillance images is open, a sensor 17 installed above the door 18 senses the temperature changes of the ambient air, and feeds the temperature change data back to a monitoring device 10. The monitoring device 10 receives the feedback data and sends a collection instruction to a sound acquiring device meeting a preset condition to instruct the sound acquiring device meeting the preset condition to collect the sounds from the door 18.

Figure 2G:
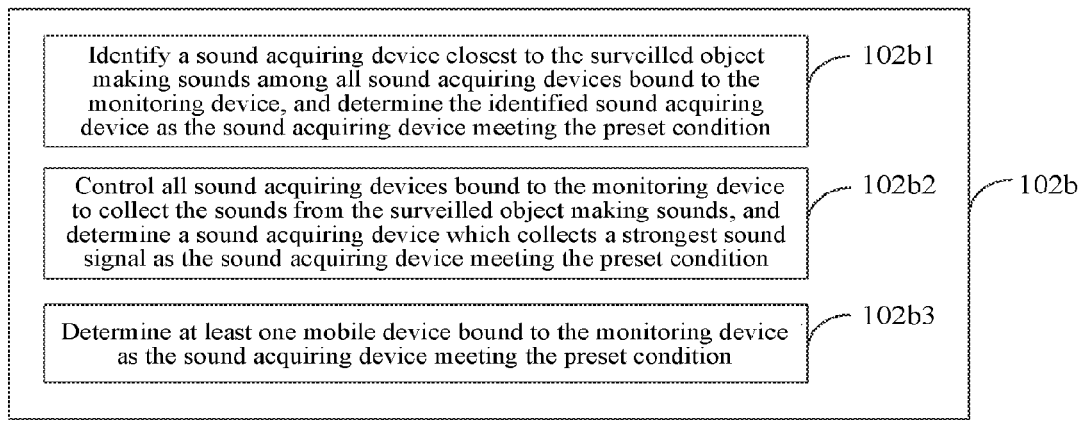
FIG. 2G is a flowchart showing a method for determining a sound acquiring device meeting a preset condition according to an exemplary embodiment.

FIG. 2G is a flowchart showing a method for determining a sound acquiring device meeting a preset condition according to an exemplary embodiment. Various example implementations of step 102n are shown in FIG. 2G. As shown in FIG. 2G, the determination of the sound acquiring device meeting a preset condition (step 102b) may include one or more of the following three implementations.

In a first implementation 102b1, a sound acquiring device closest to the sound-making surveilled object is identified among all sound acquiring devices associated with the monitoring device, and the identified sound acquiring device is determined as the sound acquiring device meeting the preset condition.

When the preset condition corresponds to that the sound acquiring device is closest to the surveilled object, the monitoring device may identify a sound acquiring device closest to the sound-making surveilled object according to the surveillance images, and determine the sound acquiring device as the sound acquiring device meeting the preset condition.

In a second implementation 102b2, all sound acquiring devices associated with the monitoring device are controlled to collect the sounds from the sound-making surveilled object, and a sound acquiring device which collects a strongest sound signal is determined as the sound acquiring device meeting the preset condition.

When the preset condition corresponds to that the sound acquiring device collects the strongest sound signal, the monitoring device may send a collection instruction to all sound acquiring devices to instruct all of the sound acquiring devices to collect the sounds from the surveilled object in the surveillance images. After receiving the collection instruction, all the sound acquiring devices start to collect the sounds from the surveilled object and send signals representing the collected sounds to the monitoring device. The monitoring device receives and checks all the sounds collected by the sound acquiring devices, determines a sound acquiring device which collects the strongest sound signal, and determines the sound acquiring device as the sound acquiring device meeting the preset condition.

Figure 2H:
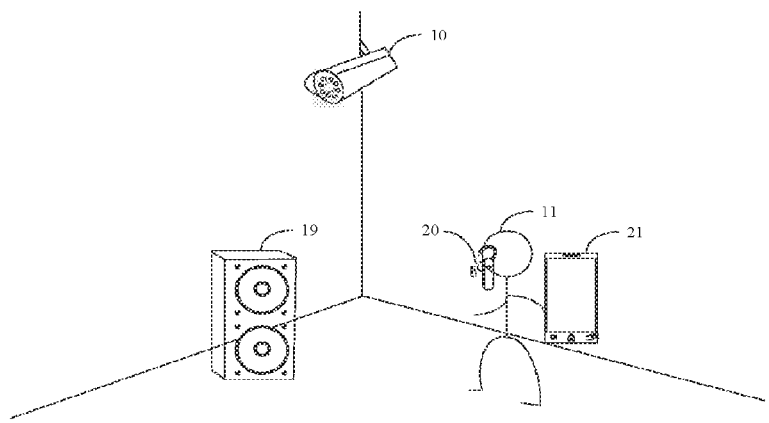
FIG. 2H is a schematic diagram showing that a sound acquiring device that detects the strongest signal strength of the sound from the identified surveilled object is determined as the sound acquiring device meeting the preset condition according to an exemplary embodiment.

FIG. 2H is a schematic diagram showing determination of the sound acquiring device which collects the strongest sound signal as the sound acquiring device meeting the preset condition according to an exemplary embodiment. As shown in FIG. 2H, there are three sound acquiring devices in surveillance images, i.e., an audio apparatus 19, a Bluetooth headset 20, and a mobile phone 21. If a person 11 enters into a surveillance area corresponding to the surveillance images, a monitoring device 10 determines the person 11 as the surveilled object, and then sends a collection instruction to the audio apparatus 19, the Bluetooth headset 20, and the mobile phone 21. After receiving the collection instruction, the three sound acquiring devices collect sounds from the person 11 and send the collected sounds to the monitoring device 10. The monitoring device 10 checks the sounds collected by the three sound acquiring devices, and determines that the Bluetooth headset 20 collects the strongest sound signal, and thereby determines the Bluetooth headset 20 as the sound acquiring device meeting the preset condition.

In a third implementation 102b3 (FIG. 2G), at least one mobile device associated with the monitoring device is determined as the sound acquiring device meeting the preset condition.

The monitoring device may be associated with mobile devices which move inside a house, such as a mobile terminal, a home cleaning robot, or a remotely controlled plane. When the surveilled object is too far from the monitoring device, one or more of these mobile devices are determined as the sound acquiring devices meeting the preset condition.

Figure 2I:
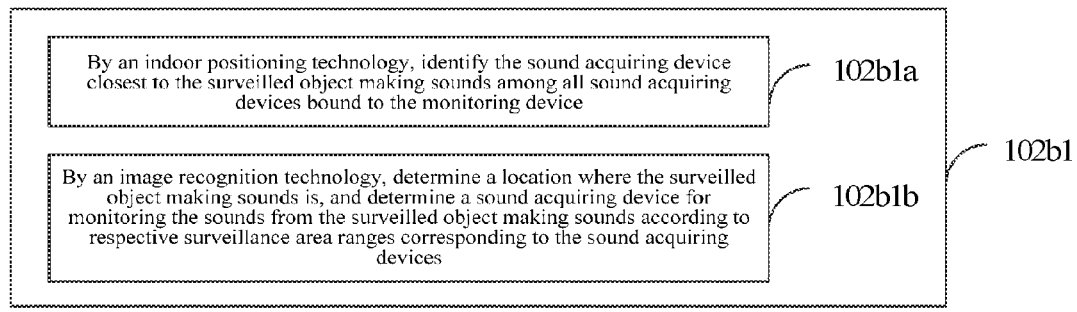
FIG. 2I is a flowchart showing a method for identifying a sound acquiring device closest to the sound-making surveilled object among all sound acquiring devices associated with the monitoring device according to an exemplary embodiment.

A possible implementation is shown in FIG. 2I which is a flowchart showing a method for identifying a sound acquiring device closest to the sound-making surveilled object in surveillance images among all sound acquiring devices associated with the monitoring device according to an exemplary embodiment. As shown in FIG. 2I, the first implementation 102b1 in step 102b may include the one or more of the following two implementations.

In a first implementation 102b1a, by performing an indoor positioning process, the sound acquiring device closest to the sound-making surveilled object is identified among all sound acquiring devices associated with the monitoring device.

Monitoring device may be installed in a plurality of rooms, and the monitoring devices may be connected via wireless or wired networks to form an indoor positioning system. Thus, persons, animals, or home appliances and the like in the interior of the rooms may be surveilled. When a sound-making surveilled object appears in surveillance images of a monitoring device, a sound acquiring device closest to the surveilled object can be identified from all the sound acquiring devices associated with the monitoring device, and the monitoring device can send a collection instruction to the sound acquiring device to instruct the sound acquiring device to collect the sounds from the surveilled object.

In a second implementation 102b1b, by performing an image recognition process, a location of the sound-making surveilled object is determined, and a sound acquiring device for monitoring the sounds from the sound-making surveilled object is determined according to respective surveillance area ranges corresponding to the sound acquiring devices.

Each sound acquiring device has individual surveillance area range. The surveillance range data of all sound acquiring devices may be recorded in the monitoring device. According to the surveillance images, the monitoring device can determine a surveillance area range of a sound acquiring device in which the sound-making surveilled object is, and thus the monitoring device can determine the sound acquiring device for monitoring the surveilled object.

Figure 2J:
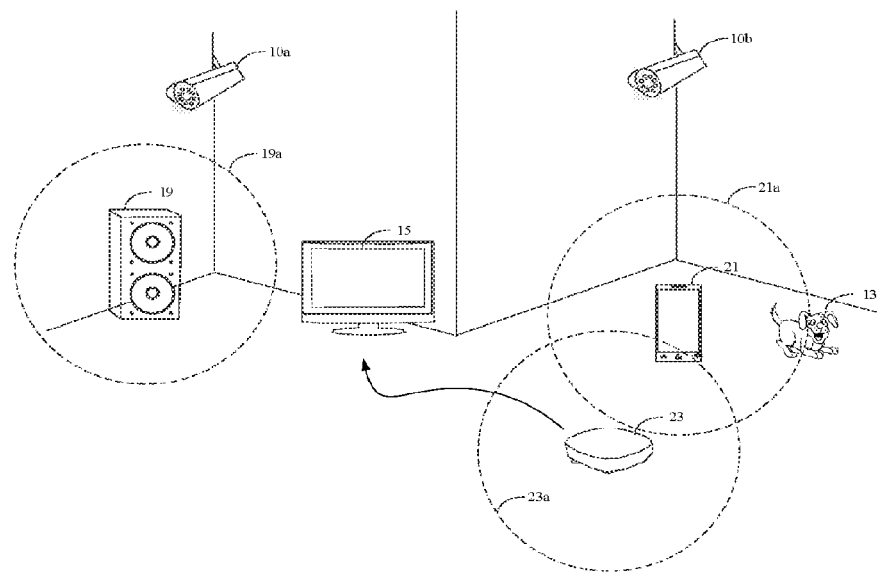
FIG. 2J is a schematic diagram showing that the monitoring device determines a sound acquiring device for monitoring the sounds from the sound-making surveilled object according to an exemplary embodiment.

FIG. 2J is a schematic diagram showing that the monitoring device determines a sound acquiring device for monitoring the sounds from the sound-making surveilled object according to an exemplary embodiment. As shown in FIG. 2J, there are two corners in the surveillance area corresponding to the current surveillance images where monitoring devices 10a and 10b are installed. The monitoring devices 10a and 10b are connected with each other via wireless or wired networks to form an indoor positioning system. When a TV 15 in the surveillance images of the monitoring device 10a is turned on, according to the surveillance images, the monitoring device 10a determines that there is only one sound acquiring device (i.e., an audio apparatus 19) in the surveillance images, but the TV 15 is not in the surveillance area range 19a of the audio apparatus 19. Thus, the monitoring device 10a sends an inquiry instruction to the monitoring device 10b to inquire whether there is a mobile device associated with all the monitoring devices in the surveillance images of the monitoring device 10b. After receiving the inquiry instruction, the monitoring device 10b determines that a home cleaning robot 23 in corresponding surveillance images is associated with all the monitoring devices, and sends a moving instruction to the home cleaning robot 23 to instruct the home cleaning robot 23 to move into a surveillance area corresponding to the surveillance images of the monitoring device 10a. The monitoring device 10a sends the home cleaning robot 23 a moving instruction for instructing the home cleaning robot 23 to move to the location adjacent to the TV 15 to make the TV 15 in the surveillance area range 23a of the home cleaning robot 23. Afterwards, the monitoring device 10a sends the home cleaning robot 23 a collection instruction for instructing the home cleaning robot 23 to collect the sounds from the TV 15.

Still referring to FIG. 2J, when a dog 13 enters into a surveillance area corresponding to the surveillance images of the monitoring device 10b, according to the surveillance images, the monitoring device 10b determines that there are two sound acquiring devices (i.e., a mobile phone 21 and the home cleaning robot 23) in the surveillance images, the dog 13 is in the surveillance area range 21a of the mobile phone 21 but not in the surveillance area range 23a of the home cleaning robot 23. At this time, the monitoring device 10b may send a collection instruction to the mobile phone 21 to instruct to the mobile phone 21 to collect the sounds from the dog 13. Further, in order to achieve at better sound collection effects, the monitoring device 10b may send the home cleaning robot 23 a moving instruction for instructing the home cleaning robot 23 to move to a location nearby the dog 13 to make the dog 13 in the surveillance area range 23a of the home cleaning robot 23, and a collection instruction for instructing the home cleaning robot 23 to collect the sounds from the dog 13.

Figure 2K:
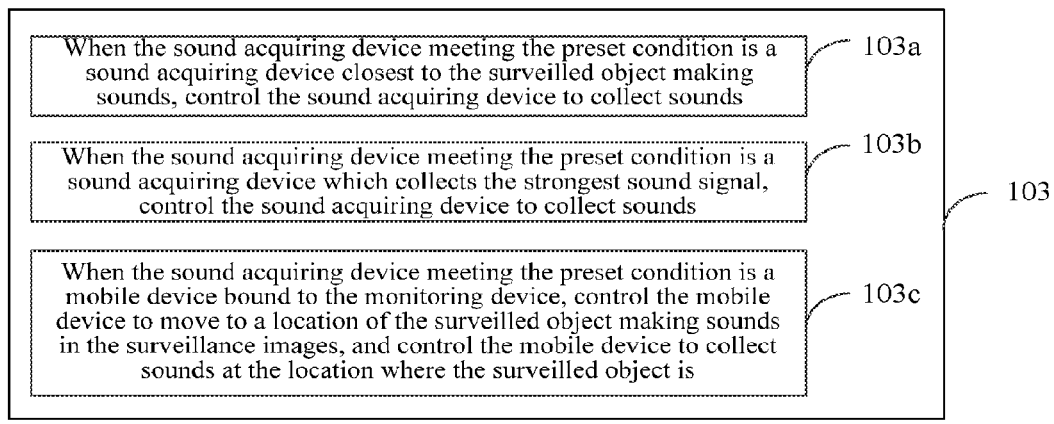
FIG. 2K is a flowchart showing a method for controlling a sound acquiring device to collect sounds from the surveilled object according to an exemplary embodiment.

FIG. 2K is a flowchart showing a method for controlling a sound acquiring device to collect sounds from a surveilled object according to an exemplary embodiment. As shown in FIG. 2K, step 103 (FIG. 1) may include one or more of the following three implementations.

In a first implementation 103a, when the sound acquiring device meeting the preset condition is a sound acquiring device closest to the sound-making surveilled object, the sound acquiring device is controlled to collect sounds.

When the monitoring device cannot collect the sounds associated with the sound-making surveilled object in the surveillance images temporarily, the monitoring device can send a collection instruction to a sound acquiring device closest to the sound-making surveilled object to instruct the sound acquiring device to collect the sounds made by the surveilled object.

In a second implementation 103b, when the sound acquiring device meeting the preset condition is a sound acquiring device which collects the strongest sound signal, the sound acquiring device is controlled to collect sounds.

When the monitoring device cannot collect the sounds associated with the sound-making surveilled object in the surveillance images temporarily, the monitoring device can send a collection instruction to a sound acquiring device which collects the strongest sound signal to instruct the sound acquiring device to collect the sounds made by the surveilled object.

In a third implementation 103c, when the sound acquiring device meeting the preset condition is a mobile device associated with the monitoring device, the mobile device is controlled to move to a location adjacent to the sound-making surveilled object in the surveillance images, and the mobile device is controlled to collect sounds at the location.

When the monitoring device determines that the sound acquiring device meeting the preset condition is a mobile device associated with the monitoring device, the monitoring device may send the mobile device a moving instruction for instructing the mobile device to move to a location nearby the sound-making surveilled object in the surveillance images, and a collection instruction for instructing the mobile device to collect the sounds from the sound-making surveilled object.

Figure 2L:
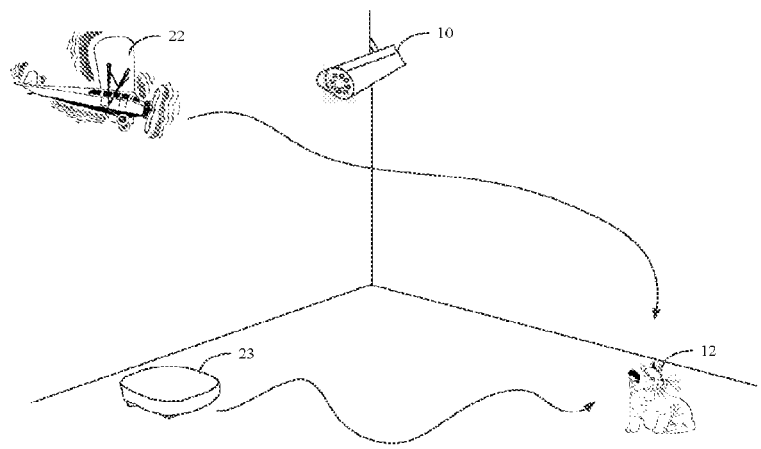
FIG. 2L is a schematic diagram showing that a monitoring device controls a mobile device to move to a location adjacent to a sound-making surveilled object in surveillance images according to an exemplary embodiment.

FIG. 2L is a schematic diagram showing that a monitoring device controls a mobile device to move to a location adjacent to a sound-making surveilled object in surveillance images according to an exemplary embodiment. As shown in FIG. 2L, when a monitoring device 10 cannot detect the sounds made by a cat 12, the monitoring device 10 determines the sound acquiring devices meeting the preset condition as a remotely controlled plane 22 or a home cleaning robot 23 associated with the monitoring device 10. The monitoring device 10 then sends the remotely controlled plane 22 or the home cleaning robot 23 a moving instruction and a collection instruction. The moving instruction instructs the remotely controlled plane 22 or the home cleaning robot 23 to move to the location adjacent to the cat 12, and the collection instruction instructs the remotely controlled plane 22 or the home cleaning robot 23 to collect the sounds made by the cat 12.

The following are embodiments of the device of the present disclosure, which may be used to perform the embodiments of the method of the present disclosure. For the undisclosed details in the embodiments of the device, refer to the embodiments of the method of the present disclosure.

Figure 3:
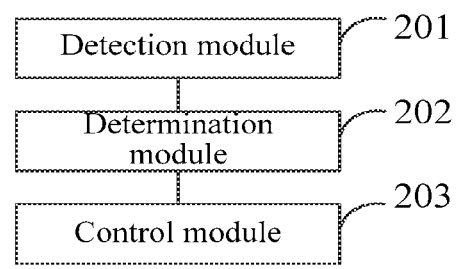
FIG. 3 is a block diagram showing a device for collecting sounds associated with surveillance images according to an exemplary embodiment.

FIG. 3 is a block diagram showing a device for recording an audio signal associated with surveillance images according to an exemplary embodiment. As shown in FIG. 3, the device for collecting sounds associated with surveillance images includes but not limited to a detection module 201, a determination module 202, and a control module 203.

The detection module 201 is configured to, when surveillance images are collected by a camera of a monitoring device, detect and identify a sound-making surveilled object in the surveillance images.

The determination module 202 is configured to, if the detection module 201 detects that there is a sound-making surveilled object in the surveillance images, determine a sound acquiring device meeting a preset condition corresponding to that a signal strength of the sound from the identified surveilled object detected by the sound acquiring device is greater than a signal strength of the sound from the identified surveilled object detected by the monitoring device.

The control module 203 is configured to control the sound acquiring device determined by the determination module 202 to collect the sounds from the surveilled object.

Figure 4:
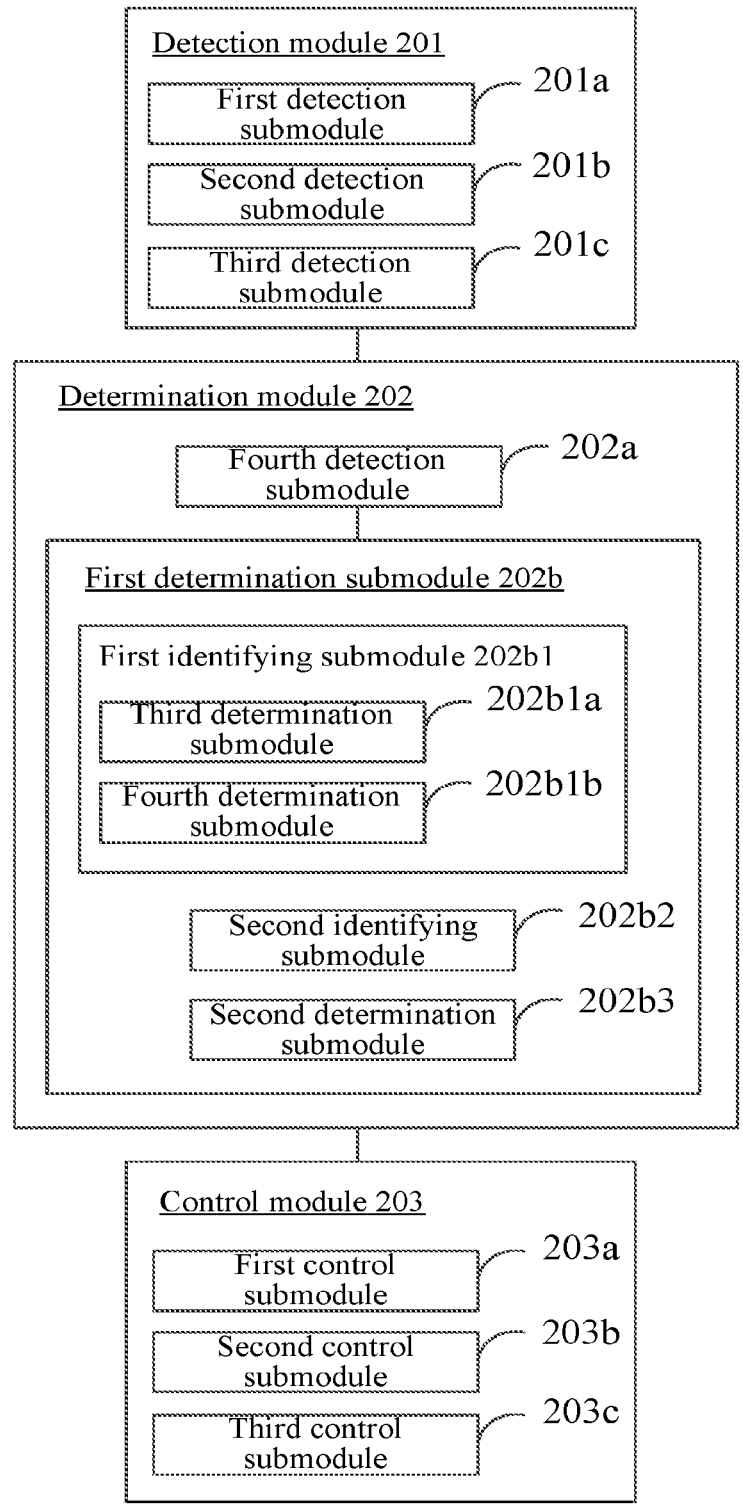
FIG. 4 is a block diagram showing a device for collecting sounds associated with surveillance images according to another exemplary embodiment.

A possible implementation is shown in FIG. 4 which is a block diagram showing a device for recording an audio signal associated with surveillance images according to another exemplary embodiment.

As shown in FIG. 4, the detection module 201 includes a first detection submodule 201a, a second detection submodule 201b, and a third detection submodule 201c.

The first detection submodule 201a is configured to detect whether there is a movement of the surveilled object that corresponds to a predetermined sound-making movement in the surveillance images. The predetermined sound-making movement includes a surveilled object entering into the surveillance images or a surveilled object whose lips move.

The second detection submodule 201b is configured to detect whether the surveilled object in the surveillance images is a predetermined sound-making object. The predetermined sound-making object includes a door, a window, or a home appliance.

The third detection submodule 201c is configured to, according to one or more parameters reported by a detection device, detect whether there is a sound-making surveilled object in the surveillance images. The detection device is a device associated with the monitoring device for detecting the one or more parameters, and the one or more parameters include on/off states, air quality parameters, temperature, parameters indicating changes of heat sources, or physiological feature parameters of the surveilled object.

In a possible implementation, still referring to FIG. 4, the determination module 202 includes a fourth detection submodule 202a and a first determination submodule 202b.

The fourth detection submodule 202a is configured to detect whether sounds associated with the surveillance images collected by the monitoring device are smaller than a preset sound threshold.

The first determination submodule 202b is configured to, if the fourth detection submodule 202a detects that the sounds associated with the surveillance images collected by the monitoring device are smaller than the preset sound threshold, determine the sound acquiring device meeting the preset condition.

In a possible implementation, still referring to FIG. 4, the first determination submodule 202b includes a first identifying submodule 202b1, a second identifying submodule 202b2, or a second determination submodule 202b3.

The first identifying submodule 202b1 is configured to identify a sound acquiring device closest to the sound-making surveilled object among all sound acquiring devices associated with the monitoring device, and determine the identified sound acquiring device as the sound acquiring device meeting the preset condition.

The second identifying submodule 202b2 is configured to control all sound acquiring devices associated with the monitoring device to collect the sounds from the sound-making surveilled object, and determine a sound acquiring device which collects a strongest sound signal as the sound acquiring device meeting the preset condition.

The second determination submodule 202b3 is configured to determine at least one mobile device associated with the monitoring device as the sound acquiring device meeting the preset condition.

In a possible implementation, still referring to FIG. 4, the first identifying submodule 202b1 includes a third identifying submodule 202b1a or a fourth determination submodule 202b1b.

The third identifying submodule 202b1a is configured to, by an indoor positioning technology, identify the sound acquiring device closest to the sound-making surveilled object among all sound acquiring devices associated with the monitoring device.

The fourth determination submodule 202b1b is configured to, by an image recognition technology, determine a location where the sound-making surveilled object is, and determine a sound acquiring device for monitoring the sounds from the surveilled object making sounds according to respective surveillance area ranges corresponding to the sound acquiring devices.

In a possible implementation, still referring to FIG. 4, the control module 203 includes a first control submodule 203a, a second control submodule 203b, or a third control submodule 203c.

The first control submodule 203a is configured to, when the sound acquiring device meeting the preset condition is a sound acquiring device closest to the sound-making surveilled object, control the sound acquiring device to collect sounds.

The second control submodule 203b is configured to, when the sound acquiring device meeting the preset condition is a sound acquiring device which collects the strongest sound signal, control the sound acquiring device to collect sounds.

The third control submodule 203c is configured to, when the sound acquiring device meeting the preset condition is a mobile device associated with the monitoring device, control the mobile device to move to a location adjacent to the sound-making surveilled object in the surveillance images, and control the mobile device to collect sounds at the location.

In view of the above, in the device for collecting sounds associated with surveillance images provided by embodiments of the present disclosure, a sound-making surveilled object in the surveillance images is identified, and a sound acquiring device which collects sounds of a greater signal strength from the surveilled object than the signal strength of the sounds collected by the monitoring device from the surveilled object is controlled to collect the sounds from the surveilled object. Thus, the present disclosure can solve the problem that a monitoring device cannot clearly collect sounds from a surveilled object which is relatively far from the monitoring device. The monitoring device controls the sound acquiring device to collect the sounds from the surveilled object, and thus the surveillance information becomes more complete.

In addition, when the monitoring device cannot clearly collect the sounds made by the surveilled object, the monitoring device may send a collection instruction to a sound acquiring device meeting a preset condition to instruct the sound acquiring device to collect the sounds from the surveilled object. The preset condition corresponding to that the sound acquiring device is closest to the surveilled object, or that the sound acquiring device collects the strongest sound signal, or that the sound acquiring device is a mobile device associated with the monitoring device.

With respect to the devices in the above embodiments, the specific manners for performing operations for individual modules therein have been described in detail in the embodiments regarding the methods, which will not be elaborated herein.

An exemplary embodiment of the present disclosure provides a device for collecting sounds associated with surveillance images, which is capable of realizing the method for collecting sounds associated with surveillance images provided by the present disclosure. The device for collecting sounds associated with surveillance images includes a processor and a memory for storing instructions executable by the processor. The processor is configured to, when surveillance images are collected by a camera of a monitoring device, detect whether there is a sound-making surveilled object in the surveillance images; if a sound-making surveilled object in the surveillance images is identified, determine a sound acquiring device meeting a preset condition corresponding to that a signal strength of the sounds collected by the sound acquiring device from the surveilled object is greater than a signal strength of the sounds collected by the monitoring device from the surveilled object; and control the sound acquiring device to collect the sounds from the surveilled object.

It is noted that the various modules, sub-modules, units, or components described in the present disclosure can be implemented using any suitable technology. In an example, a module, submodule, unit, or component can be implemented using circuitry such as an integrated circuit (IC). In an example, a module, submodule, unit, or component can be implemented as processing circuitry executing software instructions.

Figure 5:
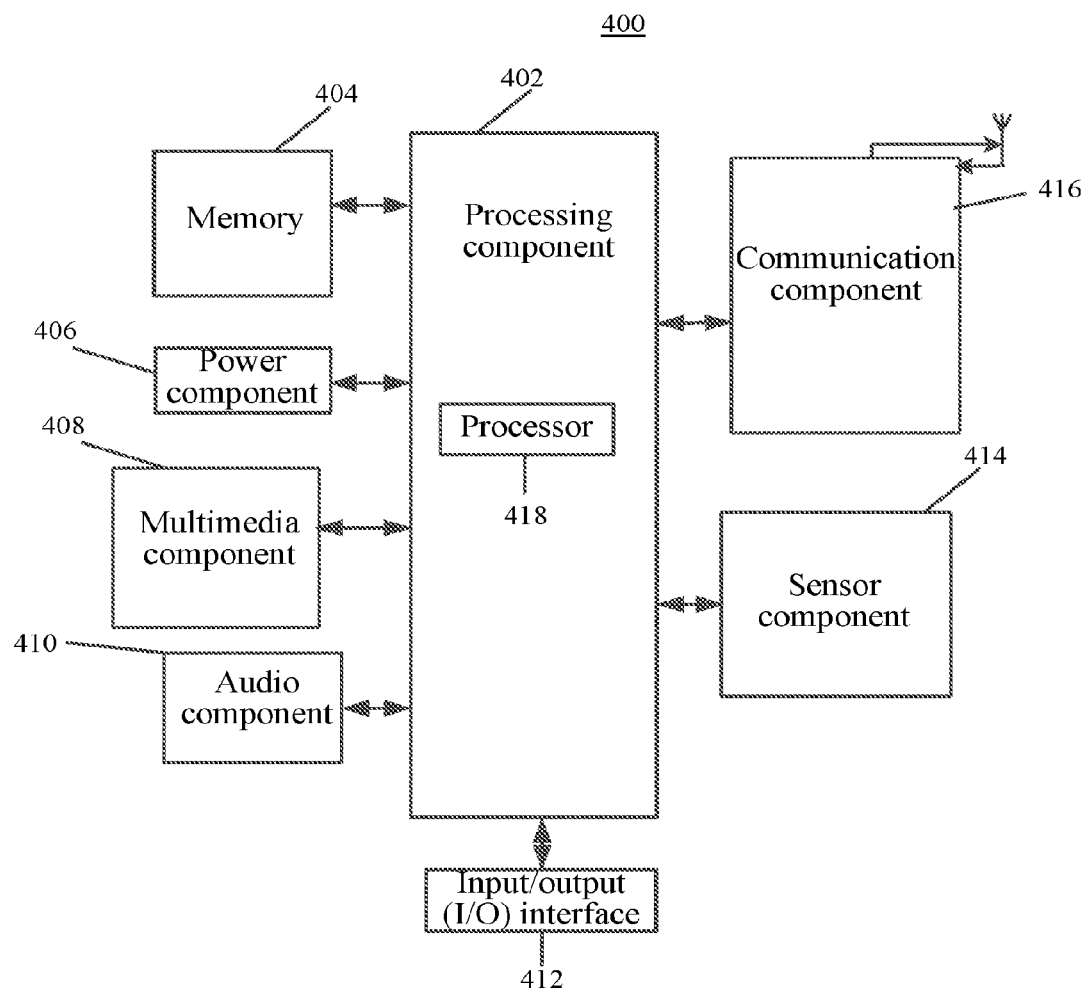
FIG. 5 is a block diagram showing a device for collecting sounds associated with surveillance images according to an exemplary embodiment.

FIG. 5 is a block diagram showing a device for collecting sounds associated with surveillance images according to an exemplary embodiment. For example, the device 400 may be a mobile phone, a computer, a digital broadcast terminal, a messaging device, a gaming console, a tablet, a medical device, exercise equipment, a personal digital assistant, and the like.

Referring to FIG. 5, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 418 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G, or 3G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for collecting sounds associated with surveillance images.

In exemplary embodiments, there is also provided a non-transitory computer-readable storage medium including instructions, such as included in the memory 404, executable by the processor 418 in the device 400, for performing the above-described methods for collecting sounds associated with surveillance images. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, and a scope and spirit of the present disclosure are indicated by the following claims.

It will be appreciated that the present disclosure is not limited to the exact configurations that has been described above and illustrated in the accompanying drawings, and that various modifications and changes can be made without departing from the scope thereof. It is intended that the scope of the present disclosure only be limited by the appended claims.

What is claimed is:

1. A method for collecting sounds associated with surveillance images, the method comprising:
    identifying a sound-making surveilled object in the surveillance images, the surveillance images being captured by a camera of a monitoring device;
    determining whether a sound acquiring device meets a preset condition, including determining that the sound acquiring device meets the preset condition when a signal strength of the sounds from the sound-making surveilled object and collected by the sound acquiring device is greater than a signal strength of the sounds from the sound-making surveilled object and collected by the monitoring device,
    wherein determining whether the sound acquiring device meets the preset condition further includes:
        identifying a sound acquiring device closest to the sound-making surveilled object among all sound acquiring devices associated with the monitoring device, and determining the identified sound acquiring device as the sound acquiring device meeting the preset condition; or
        controlling all sound acquiring devices associated with the monitoring device to collect the sounds from the sound-making surveilled object, and determining a sound acquiring device that detects a strongest signal strength of the sounds from the sound-making surveilled object as the sound acquiring device meeting the preset condition; and
    when determining that the sound acquiring device meets the preset condition, controlling the sound acquiring device to collect the sounds from the sound-making surveilled object.

2. The method according to claim 1, further comprising:
    when determining that the sound acquiring device does not meet the preset condition, collecting the sounds from the sound-making surveilled object by the monitoring device.

3. The method according to claim 1, wherein identifying the sound-making surveilled object in the surveillance images comprises:
    detecting a movement of the sound-making surveilled object that corresponds to a predetermined sound-making movement, the predetermined sound-making movement including the sound-making surveilled object entering a surveillance area or the sound-making surveilled object having moving lips; or
    determining whether the sound-making surveilled object is a predetermined sound-making object, the predetermined sound-making object including a door, a window, or a home appliance; or detecting, by a detection device associated with the sound-making surveilled object, one or more parameters, and identifying the sound-making surveilled object based on the one or more parameters from the detection device, the one or more parameters including an on/off state, a temperature, a change of a heat source, or a physiological feature of the sound-making surveilled object.

4. The method according to claim 1, wherein determining whether the sound acquiring device meets the preset condition further comprises:

determining that the sound acquiring device meets the preset condition when the signal strength of the sounds from the sound-making surveilled object and collected by the monitoring device is smaller than a preset sound threshold.

5. The method according to claim 1, wherein identifying the sound acquiring device closest to the sound-making surveilled object among all the sound acquiring devices associated with the monitoring device comprises:

identifying the sound acquiring device closest to the sound-making surveilled object among all the sound acquiring devices associated with the monitoring device by performing an indoor positioning process; or determining a location of the sound-making surveilled object by performing an image recognition process, and determining a sound acquiring device for monitoring the sounds from the sound-making surveilled object according to respective surveillance area ranges corresponding to the sound acquiring devices.

6. A device for collecting sounds associated with surveillance images, comprising:

a processor; and a memory for storing instructions executable by the processor;

wherein the processor is configured to:

identify a sound-making surveilled object in the surveillance images, the surveillance images being captured by a camera of a monitoring device;

determine whether a sound acquiring device meets a preset condition, including determining that the sound acquiring device meets the preset condition when a signal strength of the sounds from the sound-making surveilled object and collected by the sound acquiring device is greater than a signal strength of the sounds from the sound-making surveilled object and collected by the monitoring device, wherein, when determining whether the sound acquiring device meets the preset condition, the processor is further configured to:

identify a sound acquiring device closest to the sound-making surveilled object among all sound acquiring devices associated with the monitoring device, and determining the identified sound acquiring device as the sound acquiring device meeting the preset condition; or control all sound acquiring devices associated with the monitoring device to collect the sounds from the sound-making surveilled object, and determining a sound acquiring device that detects a strongest signal strength of the sounds from the sound-making surveilled object as the sound acquiring device meeting the preset condition; and when determining that the sound acquiring device meets the preset condition, control the sound acquiring device to collect the sounds from the sound-making surveilled object.

7. The device according to claim 6, wherein the processor is configured to when determining that the sound acquiring device does not meet the preset condition, collect the sounds from the sound-making surveilled object by the monitoring device.

8. The device according to claim 6, wherein, when identifying the sound-making surveilled object in the surveillance images, the processor is configured to detect a movement of the sound-making surveilled object that corresponds to a predetermined sound-making movement, the predetermined sound-making movement including the sound-making surveilled object entering a surveillance area or the sound-making surveilled object having moving lips; or determine whether the sound-making surveilled object is a predetermined sound-making object, the predetermined sound-making object including a door, a window, or a home appliance; or detect, by a detection device associated with the sound-making surveilled object, one or more parameters, and identify the sound-making surveilled object based on the one or more parameters from the detection device, the one or more parameters including an on/off state, a temperature, a change of a heat source, or a physiological feature of the sound-making surveilled object.

9. The device according to claim 6, wherein the processor is configured to determine that the sound acquiring device meets the preset condition when the signal strength of the sounds from the sound-making surveilled object and collected by the monitoring device is smaller than a preset sound threshold.

10. The device according to claim 6, wherein, when identifying the sound acquiring device closest to the sound-making surveilled object among all the sound acquiring devices associated with the monitoring device, the processor is configured to identify the sound acquiring device closest to the sound-making surveilled object among all the sound acquiring devices associated with the monitoring device by performing an indoor positioning process; or determine a location of the sound-making surveilled object by performing an image recognition process, and determining a sound acquiring device for monitoring the sounds from the sound-making surveilled object according to respective surveillance area ranges corresponding to the sound acquiring devices.

11. A non-transitory computer-readable storage medium having stored therein instructions that, when executed by a processor of a monitoring device, causes the monitoring device to perform a method for collecting sounds associated with surveillance images, the method comprising:

identifying a sound-making surveilled object in the surveillance images, the surveillance images being captured by a camera of a monitoring device;

determining whether a sound acquiring device meets a preset condition, including determining that the sound acquiring device meets the preset condition when a signal strength of the sounds from the sound-making surveilled object and collected by the sound acquiring device is greater than a signal strength of the sounds from the sound-making surveilled object and collected by the monitoring device, wherein determining whether the sound acquiring device meets the preset condition further includes:

identifying a sound acquiring device closest to the sound-making surveilled object among all sound acquiring devices associated with the monitoring device, and determining the identified sound acquiring device as the sound acquiring device meeting the preset condition; or controlling all sound acquiring devices associated with the monitoring device to collect the sounds from the sound-making surveilled object, and determining a sound acquiring device that detects a strongest signal strength of the sounds from the sound-making surveilled object as the sound acquiring device meeting the preset condition; and when determining that the sound acquiring device meets the preset condition, controlling the sound acquiring device to collect the sounds from the sound-making surveilled object.

12. The non-transitory computer-readable storage medium according to claim 11, wherein the method further comprising:

when determining that the sound acquiring device does not meet the preset condition, collecting the sounds from the sound-making surveilled object by the monitoring device.

13. The non-transitory computer-readable storage medium according to claim 11, wherein identifying the sound-making surveilled object comprises:

detecting a movement of the sound-making surveilled object that corresponds to a predetermined sound-making movement, the predetermined sound-making movement including the sound-making surveilled object entering a surveillance area or the sound-making surveilled object having moving lips; or determining whether the sound-making surveilled object is a predetermined sound-making object, the predetermined sound-making object including a door, a window, or a home appliance; or detecting, by a detection device associated with the sound-making surveilled object, one or more parameters, and identifying the sound-making surveilled object based on the one or more parameters from the detection device, the one or more parameters including an on/off state, a temperature, a change of a heat source, or a physiological feature of the sound-making surveilled object.

14. The non-transitory computer-readable storage medium according to claim 11, wherein determining whether the sound acquiring device meets the preset condition further comprises:

determining that the sound acquiring device meets the preset condition when the signal strength of the sounds from the sound-making surveilled object and collected by the monitoring device is smaller than a preset sound threshold.

15. The non-transitory computer-readable storage medium according to claim 11, wherein identifying the sound acquiring device closest to the sound-making surveilled object among all the sound acquiring devices associated with the monitoring device comprises:

identifying the sound acquiring device closest to the sound-making surveilled object among all the sound acquiring devices associated with the monitoring device by performing an indoor positioning process; or determining a location of the sound-making surveilled object by performing an image recognition process, and determining a sound acquiring device for monitoring the sound from the sound-making surveilled object according to respective surveillance area ranges corresponding to the sound acquiring devices.

* * * * *